US012722419B2

(12) United States Patent
Rodrigues

(10) Patent No.: US 12,722,419 B2
(45) Date of Patent: Sep. 1, 2026

(54) ABSTRACT PAINTING APPARATUS

(71) Applicant: Cesar Junior Rodrigues, Worcester, MA (US)

(72) Inventor: Cesar Junior Rodrigues, Worcester, MA (US)

( * ) Notice: Subject to any disclaimer, the term of this patent is extended or adjusted under 35 U.S.C. 154(b) by 917 days.

(21) Appl. No.: 18/147,574

(22) Filed: Dec. 28, 2022

(65) Prior Publication Data

US 2023/0202227 A1 Jun. 29, 2023

Related U.S. Application Data

(60) Provisional application No. 63/294,222, filed on Dec. 28, 2021.

(51) Int. Cl.
*B44D 3/22* (2006.01)
*B05B 13/02* (2006.01)
*B05B 15/80* (2018.01)

(52) U.S. Cl.
CPC ............ *B44D 3/22* (2013.01); *B05B 13/0285* (2013.01); *B05B 15/80* (2018.02)

(58) Field of Classification Search
None
See application file for complete search history.

(56) References Cited

U.S. PATENT DOCUMENTS 3,540,787 A * 11/1970 Ford ...................... A47B 97/08 312/231
4,060,649 A 11/1977 Coleman
4,093,326 A * 6/1978 Ford ...................... A47B 97/08 312/231
4,770,089 A * 9/1988 Vinicombe ............. B05B 16/40 118/326

(Continued)

FOREIGN PATENT DOCUMENTS

CN 111389677 A * 7/2020 ......... B05C 17/0357
CN 111729800 A * 10/2020 ........... B05D 3/0413

(Continued)

OTHER PUBLICATIONS

Giant Classroom Spin Art Center, retrieved from the internet, retrieved on Dec. 28, 2022; <URL: https://www.lakeshorelearning.com/products/arts-crafts/paint-painting-accessories/giant-classroom-spin-art-center/p/FF246>.

(Continued)

*Primary Examiner* — Binu Thomas
*Assistant Examiner* — Wasiqul Haq

(57) ABSTRACT

An abstract painting apparatus includes a paint box, a tripod system, a canvas mount, a gantry system, and a paint discharge system. The paint box includes a first leg, a second leg, a third leg, a fourth leg, a lateral cover, and a slanted bottom cover as the lateral cover is perimetrically mounted around the first leg, the second leg, the third leg, and the fourth leg. The slanted bottom cover is perimetrically mounted to the lateral cover. The tripod system is concentrically mounted through the slanted bottom cover. The canvas mount is pivotably mounted to the tripod system and positioned within the paint box. The gantry system is mounted onto the paint box and positioned atop the canvas mount. The paint discharge system is operatively coupled to the gantry system, wherein the paint discharge system is moved above the canvas mount by the gantry system.

13 Claims, 8 Drawing Sheets

(56) References Cited

U.S. PATENT DOCUMENTS

| | | | | | |
|---|---|---|---|---|---|
| 4,928,625 | A | | 5/1990 | Woods | |
| 5,083,737 | A | * | 1/1992 | Rifkin | A47B 97/04<br>248/447 |
| 5,090,361 | A | * | 2/1992 | Ishibashi | B25J 18/005<br>118/313 |
| 6,024,348 | A | * | 2/2000 | Ventura | B05B 13/0285<br>269/104 |
| 6,095,438 | A | * | 8/2000 | Fratello | B60S 3/04<br>118/316 |
| 6,595,777 | B1 | * | 7/2003 | Summar | B44D 2/00<br>434/84 |
| 7,429,298 | B2 | | 9/2008 | Krogedal et al. | |
| 2004/0155159 | A1 | * | 8/2004 | Tiffen | F16M 11/2014<br>248/168 |
| 2009/0272488 | A1 | * | 11/2009 | Ogasawara | B05D 7/577<br>427/375 |
| 2010/0009616 | A1 | * | 1/2010 | Norcross | B05B 12/18<br>454/53 |
| 2011/0274827 | A1 | * | 11/2011 | Fritz | B05B 14/437<br>118/610 |
| 2020/0189295 | A1 | * | 6/2020 | Mombourquette | B05C 5/02 |
| 2021/0252736 | A1 | * | 8/2021 | Blackwelder | B05B 13/0207 |

FOREIGN PATENT DOCUMENTS

| | | | | | |
|---|---|---|---|---|---|
| CN | 112474219 | A | * | 3/2021 | B05B 9/002 |
| EP | 0421791 | A2 | | 4/1991 | |
| KR | 102264432 | B1 | * | 6/2021 | B05C 11/10 |
| WO | WO-2018185636 | A1 | * | 10/2018 | B05D 1/26 |

OTHER PUBLICATIONS

YouTube's favourite spin artist makes a beautiful mess, retrieved from the internet, retrieved on Dec. 28, 2022; <URL: https://www.youtube.com/watch?v=yn_LLSXhBAg&t=78s>.

* cited by examiner

ABSTRACT PAINTING APPARATUS

The current application claims a priority to the U.S. provisional patent application Ser. No. 63/294,222 filed on Dec. 28, 2021.

FIELD OF THE INVENTION

The present invention generally relates to painting apparatuses. More specifically, the present invention is an automated and abstract painting apparatus that can be utilized by physically disabled users.

BACKGROUND OF THE INVENTION

Throughout history, art has been a gradually growing topic. Art is simply the expression or application of creativity and imagination displayed by visual objects or imaginary scenarios. As humans develop technology and equipment for general use, the application of technology and equipment can be identified in the art industry. In addition, the development and creation of equipment and apparatuses specifically for art is also a gradually growing trend so that difficult artistic technics can be simplified. As a result, more and more people are attracted to the art industry as a way of expressing their creativity. However, physically disabled people are generally unable to participate in art due to their physical and mental limitations.

Therefore, an objective of the present invention is to provide an abstract painting system that accommodates individuals that are interested in art. The present invention provides an abstract painting apparatus that uses modern technology to pour the paint onto a canvas that can tilt and spin while the paint is applied. Furthermore, the present invention provides a catch system to capture and collect excessive paint that has been used on the canvas. Furthermore, the present invention allows the users to incorporate their personal creativity into the canvas painting through a water spray nozzle, an air spray nozzle, and other related features.

SUMMARY OF THE INVENTION

The present invention is an abstract painting apparatus that introduces the automated equipment technology into the art industry so that individuals are able to express artistic expressions effortlessly and easily on a canvas. The present invention aids the individuals to complete an abstract art piece with reference to customized personal preferences and different painting technics through the functional components of the present invention.

DETAILED DESCRIPTION OF THE INVENTION

All illustrations of the drawings are for the purpose of describing selected versions of the present invention and are not intended to limit the scope of the present invention.

Figure 1:
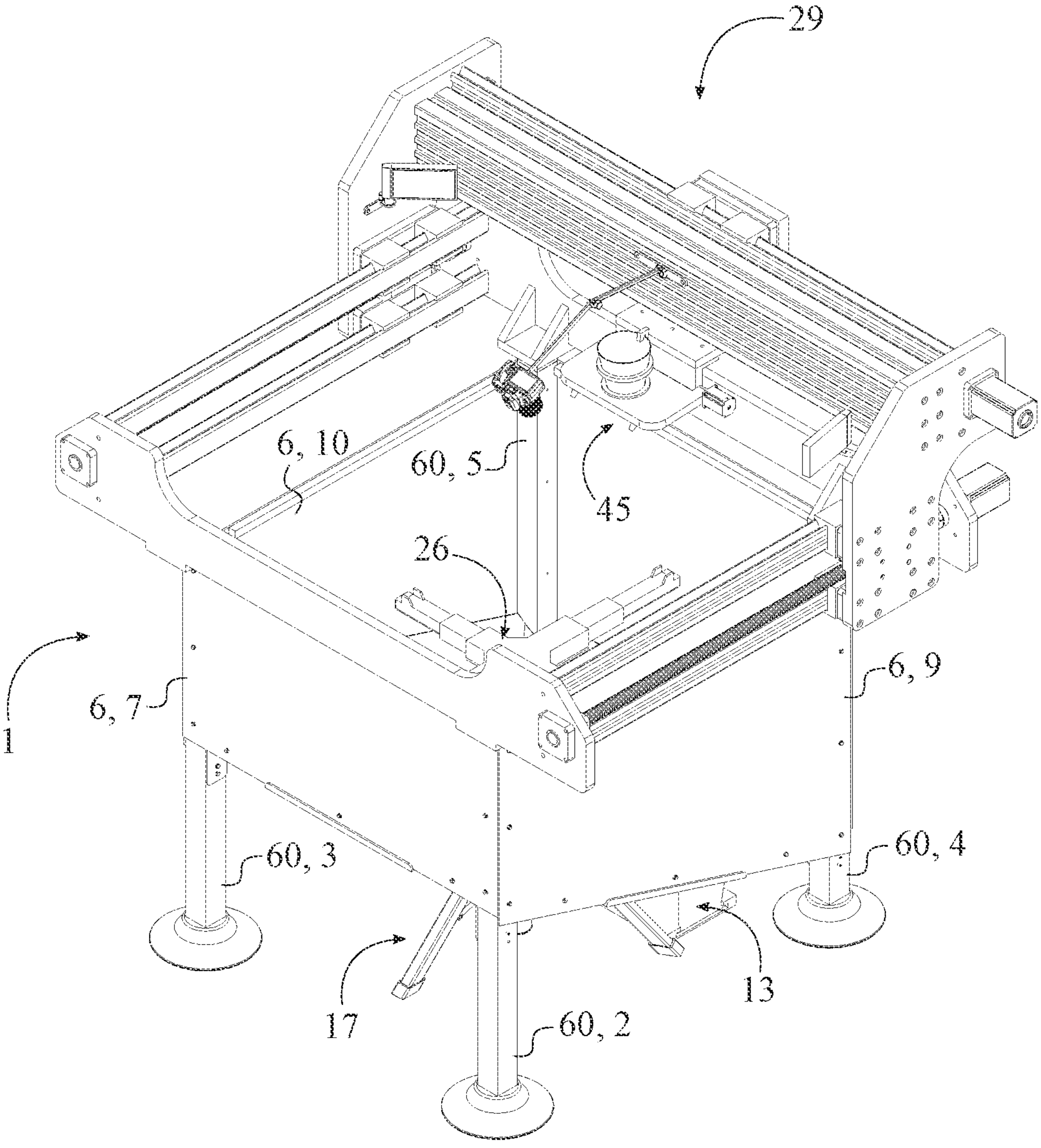
FIG. 1 is a front-top perspective view of the present invention.
Figure 2:
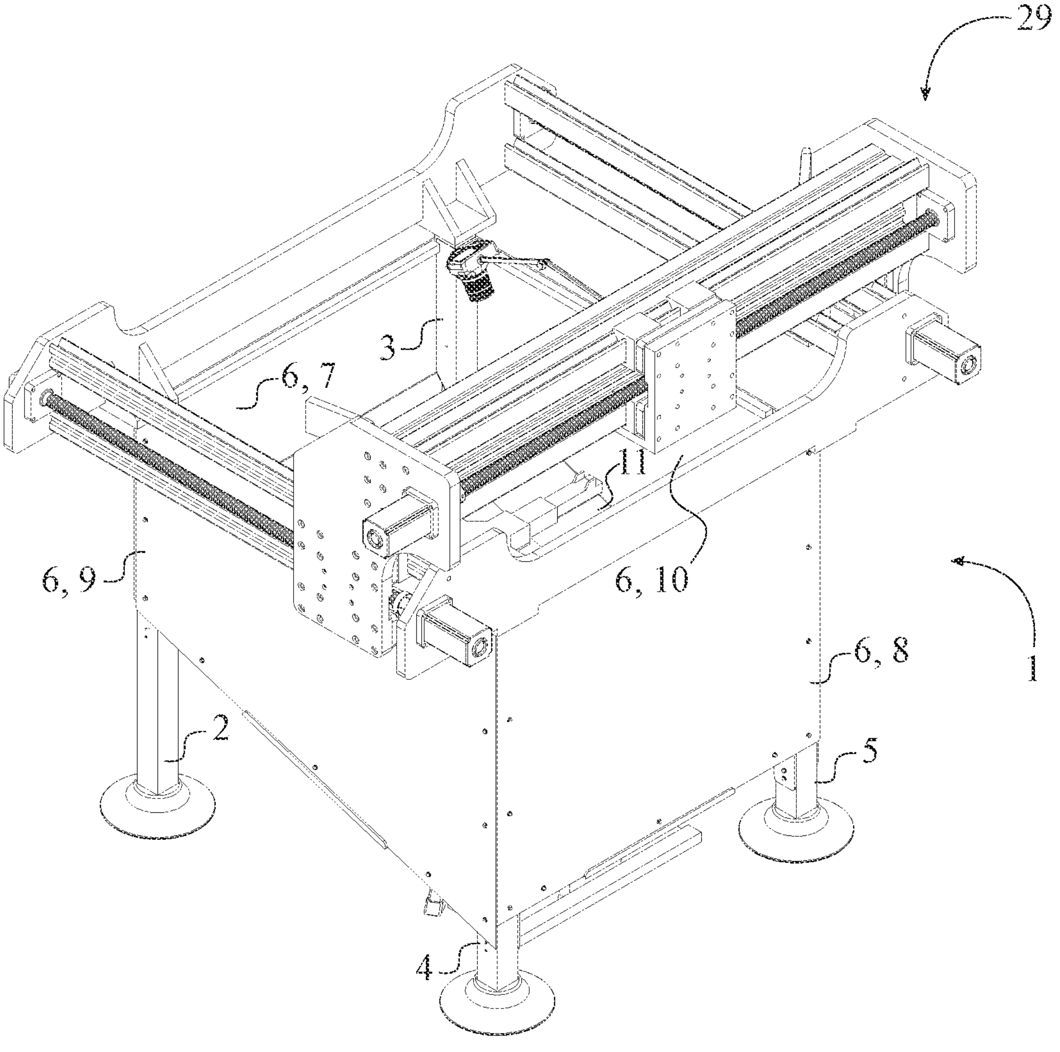
FIG. 2 is a rear-top perspective view of the present invention.
Figure 3:
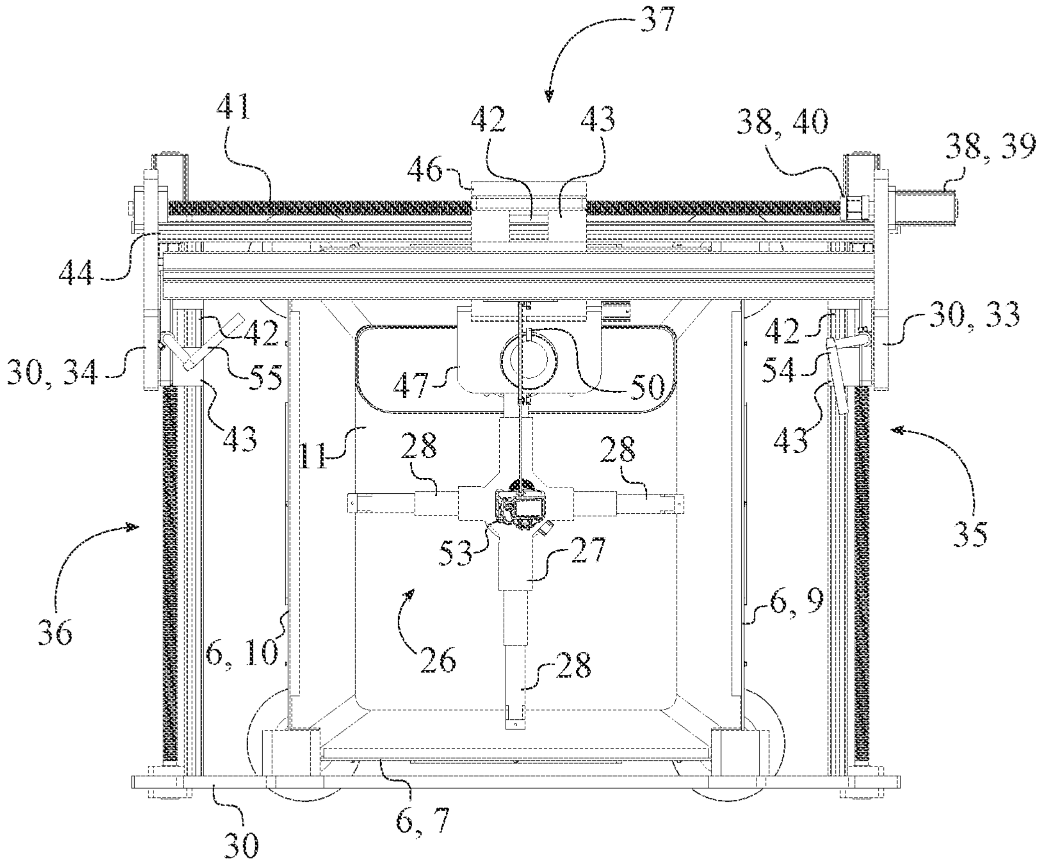
FIG. 3 is a top view of the present invention.

The present invention is an abstract painting apparatus that uses automated technology to pour the paint onto a canvas or of the likes to create an artistic piece. The present invention also allows further customization to the artistic piece through a plurality of integrated features so that the users can add a creative characteristic to the art piece. As shown in FIGS. 1-3, the present invention comprises a paint box 1, a tripod system 17, a canvas mount 26, a gantry system 29, and a paint discharge system 45.

In reference to the general configuration of the present invention, as shown in FIGS. 1-6, the paint box 1 that surrounds the canvas comprises a plurality of legs 60, a lateral cover 6, and a slanted bottom cover 11. The plurality of legs 60 comprises a first leg 2, a second leg 3, a third leg 4, a fourth leg 5. The lateral cover 6 is perimetrically mounted around the first leg 2, the second leg 3, the third leg 4, and the fourth leg 5 as the paint box 1 is elevated through the first leg 2, the second leg 3, the third leg 4, and the fourth leg 5. The slanted bottom cover 11 is perimetrically mounted to the lateral cover 6 thus delineating a top opening at the top of the paint box 1. The tripod system 17 is concentrically mounted through the slanted bottom cover 11 so that the canvas mount 26 can be pivotably and terminally mounted to the tripod system 17 within the paint box 1. In other words, the canvas mount 26 is positioned within the lateral cover 6 and the slanted bottom cover 11 so the user can place the canvas through the top opening. The gantry system 29 is mounted onto the first leg 2, the second leg 3, the third leg 4, and the fourth leg 5 and positioned atop the canvas mount 26 so that the paint discharge system 45 can be moved within the lateral cover 6. In other words, the paint discharge system 45 is operatively coupled to the gantry system 29 so that the paint discharge system 45 is able to move above the canvas mount 26 to pour the paint onto the canvas, wherein the movement of the gantry system 29 and the operation of the paint discharge system 45 are controlled by the user.

The paint box 1 functions as the main stationary body 23 of the present invention so that the rest of the components can be secured. In reference to FIGS. 1-3, the paint box 1 is preferably shaped into a rectangular shape as the lateral cover 6 is mounted about the top edge of the first leg 2, the second leg 3, the third leg 4, and the fourth leg 5. As a result, the first leg 2, the second leg 3, the third leg 4, and the fourth leg 5 are able to elevate the lateral cover 6 above the ground surface to create functional space underneath the slanted bottom cover 11. More specifically, the lateral cover 6 may comprise a front cover 7, a rear cover 8, a left cover 9, and a right cover 10. The front cover 7 is externally mounted to the first leg 2 and the second leg 3. The rear cover 8 is externally mounted to the third leg 4 and the fourth leg 5. The left cover 9 is externally mounted to the first leg 2 and the third leg 4. The right cover 10 is externally mounted to the second leg 3 and the fourth leg 5. The slanted bottom cover 11 is perimetrically mounted to the front cover 7, the rear cover 8, the left cover 9, and the right cover 10 so that the top opening can be delineated. When the paint discharge system 45 is operational within the paint box 1, any excess paint that is discharged away from the canvas is blocked and redirected toward the slanted bottom cover 11 via the lateral cover 6. In other words, the front cover 7, the rear cover 8, the left cover 9, and the right cover 10 are able to contain the excess paint within the present invention to eliminate unnecessary paint cleanup, splashing, and spattering.

Figure 4:
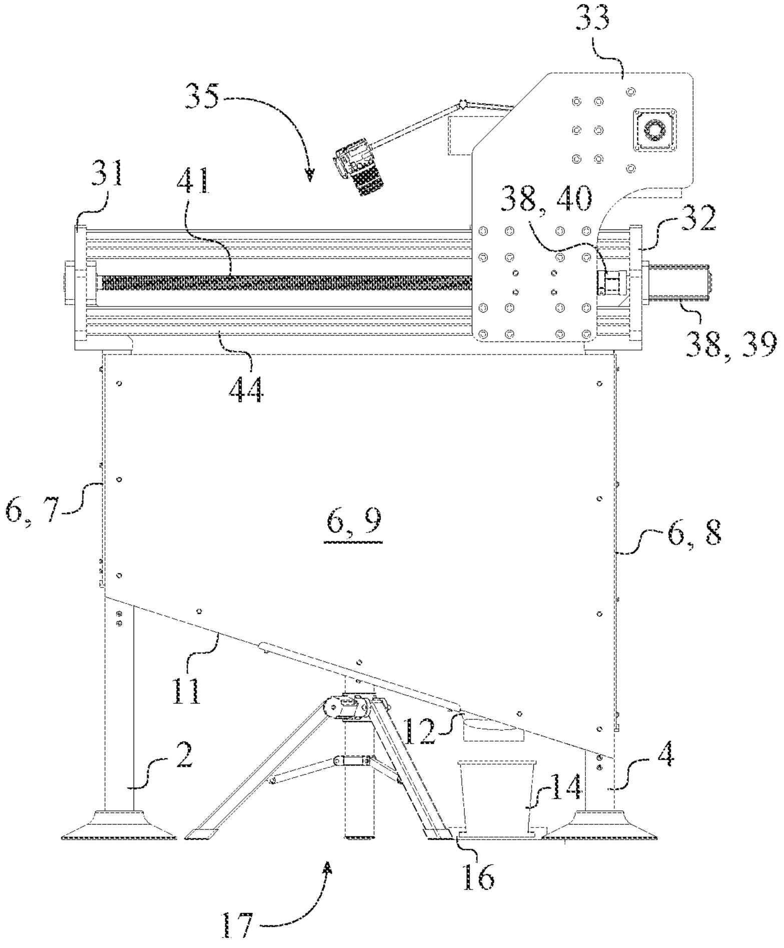
FIG. 4 is a left view of the present invention.
Figure 5:
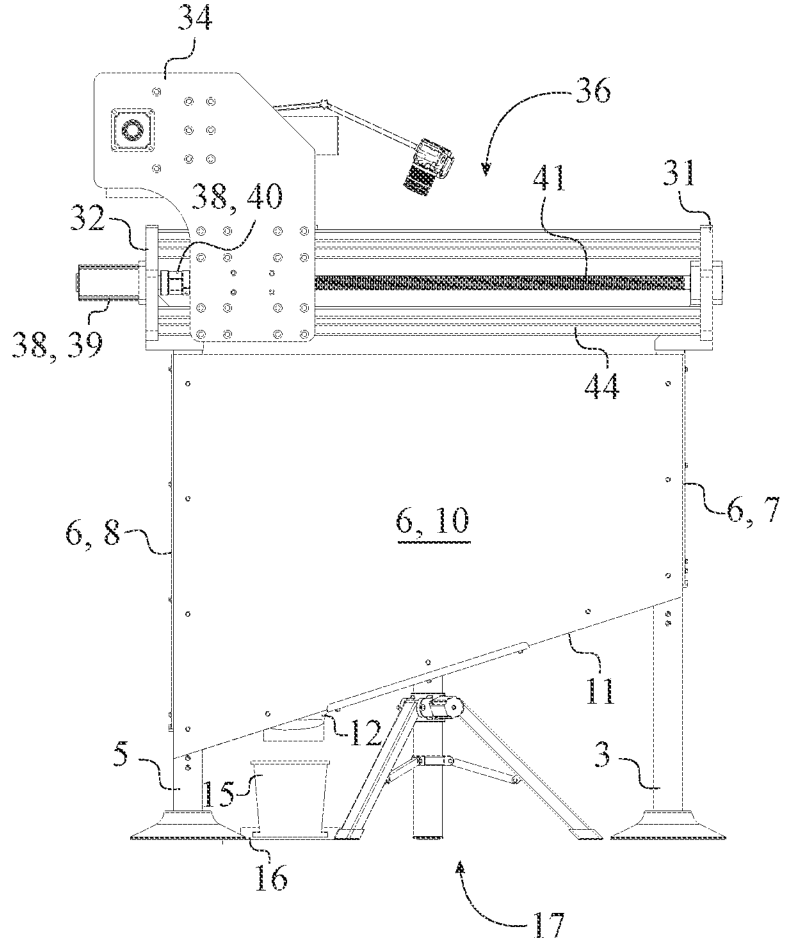
FIG. 5 is a right view of the present invention.

In reference to FIG. 1, FIG. 4, and FIG. 5, the paint box 1 may further comprise a drain 12 and a gutter system 13 so that the excess paint can be collected and reused. More specifically, the drain 12 is mounted to the slanted bottom cover 11 so that the excess paint can trickle toward the drain 12. In order to collect all of the excess paint, the drain 12 is preferably placed at the lowest point of the slanted bottom cover 11. The gutter system 13 and the canvas mount 26 are oppositely positioned of each other about the slanted bottom cover 11 as the gutter system 13 is mounted offset from the drain 12. More specifically, the gutter system 13 is mounted to the ground floor and below the drain 12 so that the excess paint can be efficiently collected.

In reference to FIG. 4 and FIG. 5, the gutter system 13 preferably comprises a first bucket 14, a second bucket 15, and a support track 16. More specifically, the support track 16 is extended in between the left cover 9 and the right cover 10 and positioned below the drain 12. The support track 16 functions as a base for the selection of the first bucket 14 and the second bucket 15. In other words, the first bucket 14 is slidably mounted along the support track 16 so that the user can preferably use the first bucket 14 as an excess paint collection container to reuse the collected paint. However, the first bucket 14 can also be used as excess water collection container or a primary waste collection container. The second bucket 15 is slidably mounted along the support track 16 so that the user can preferably use the second bucket 15 as an excess water collection container. However, the second bucket 15 can also be used as an excess paint collection container or a secondary waste collection container. Even through the first bucket 14 and the second bucket 15 are manually moved along the support track 16 within the preferred embodiment of the present invention, the movement of the first bucket 14 and the second bucket 15 can be automated without deviating from the scope of the functionality.

Figure 7:
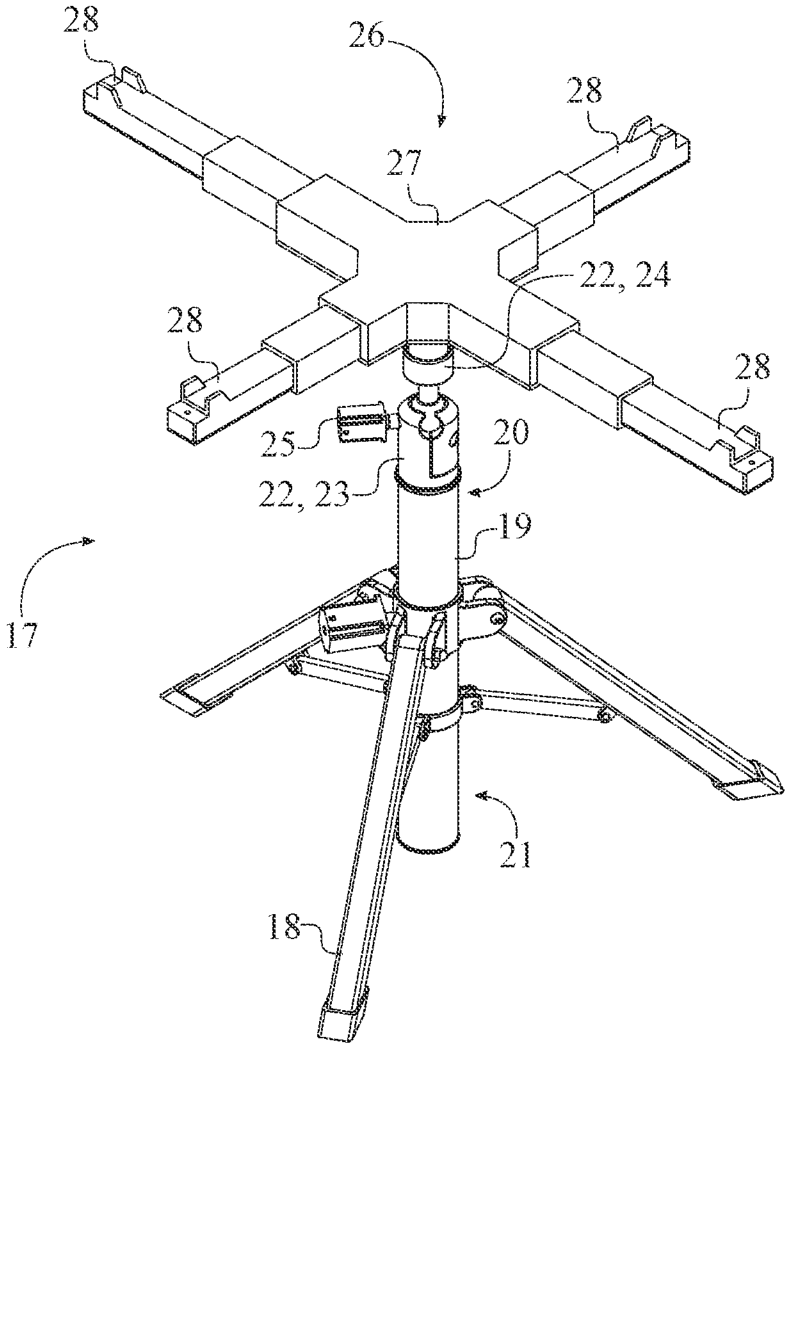
FIG. 7 is a perspective view of the tripod system of the present invention.

The tripod system 17 functions as the elevated stand so that the canvas can be secured within the paint box 1. In reference to FIG. 7, the tripod system 17 may comprise a retractable base 18, an extension shaft 19, a ball mount mechanism 22, and a tripod motor 25. The retractable base 18 is connected to a proximal end 21 of the extension shaft 19 and positioned below the slanted bottom cover 11 so that the tripod system 17 can stand vertically on the ground surface. The ball mount mechanism 22 functions as a 360-degree rotatable unit and comprises a stationary body 23 and a rotatably body. More specifically, the stationary body 23 of the ball mount mechanism 22 is connected to a distal end 20 of the extension shaft 19 and positioned atop the bottom slanted cover. The tripod motor 25 is integrated into the stationary body 23 so that the rotary body 24 of the ball mount mechanism 22 can be controlled through the tripod motor 25. In other words, the rotary body 24 of the ball mount mechanism 22 is pivotably engaged with the tripod motor 25 through the stationary body 23 thus allowing the canvas mount 26 to be concentrically mounted to the rotary body 24. As a result, the user can remotely rotate, tilt, and linearly move the canvas mount 26 within the paint box 1 to complete the desired canvas painting through the operation of the tripod motor 25. Furthermore, the overall height of the extension shaft 19 can also be adjusted according to user preferences.

The canvas mount 26 functions as the locking unit that secures the canvas so that the ball mount mechanism 22 can be operated according to the user preferences. In reference to FIG. 3 and FIG. 7, the canvas mount 26 may comprise a hub 27 and a plurality of telescopic arms 28. More specifically, the plurality of telescopic arms 28 is equally spaced around the hub 27 and terminally connected to the hub 27. The plurality of telescopic arms 28 allows the canvas mount 26 to be adjusted according to different sized canvases as each of the plurality of telescopic arms 28 engages around the outer parameter of the canvas. The hub 27 is concentrically mounted to the rotary body 24 of the ball mount mechanism 22 so that the movements of the rotary body 24 can be simultaneously and consistently transferred to the plurality of telescopic arms 28 via the hub 27.

The gantry system 29 is responsible for providing possible movement and mobility for the paint discharge system 45 during the painting process. In reference to FIGS. 3-5, the gantry system 29 may comprise a plurality of mounts 30, a left linear actuator assembly 35, a right linear actuator assembly 36, and a cross actuator assembly 37. The plurality of mounts 30 that secures the gantry system 29 to the paint box 1 may comprise a front mount 31, a rear mount 32, a left mount 33, and a right mount 34. The front mount 31 is mounted onto the first leg 2 and the second leg 3. The rear mount 32 is mounted onto the third leg 4 and the fourth leg 5. As a result, the front mount 31 and the rear mount 32 function as the two structural components that secure the gantry system 29 to the paint box 1. The left linear actuator assembly 35 is mounted to the front mount 31 and the rear mount 32 as the left linear actuator assembly 35 is extended from the first leg 2 to the third leg 4. The right linear actuator assembly 36 is mounted to the front mount 31 and the rear mount 32 as the right linear actuator assembly 36 is extended from the second leg 3 to the fourth leg 5. In other words, the left linear actuator assembly 35 provides linear movement that is parallel to the left cover 9, and the right linear actuator assembly 36 provides linear movement that is parallel to the right cover 10. The left mount 33 is slidably mounted to the left linear actuator assembly 35 and positioned perpendicular to the front mount 31. As a result, the linear movement of the left linear actuator assembly 35 is able to move the left mount 33 in between the front mount 31 and the rear mount 32. The right mount 34 is slidably mounted to the right linear actuator assembly 36 and positioned perpendicular to the front mount 31. As a result, the linear movement of the right linear actuator assembly 36 is able to move the right mount 34 in between the front mount 31 and the rear mount 32. The cross actuator assembly 37 is mounted to the left mount 33 and the right mount 34 as the cross actuator assembly 37 is extended from the left cover 9 to the right cover 10. As a result, linear movement of the cross actuator assembly 37 is able to move the paint discharge system 45 in between the left mount 33 and the right mount 34. The user is able to remotely control the movement of the left linear actuator assembly 35, the right linear actuator assembly 36, and the cross actuator assembly 37 thus allowing to complete a desired canvas painting.

In reference to FIGS. 3-5, the left linear actuator assembly 35, the right linear actuator assembly 36, and the cross actuator assembly 37 may each comprise an actuator motor 38, a lead screw 41, a bi-directional nut 42, at least one sliding bracket 43, and at least one rail 44. A stator 39 of the actuator motor 38 is mounted to an arbitrary mount from the plurality of mounts 30. The lead screw 41 is rotatably mounted to an opposing mount from the plurality of mounts 30, wherein the arbitrary mount and the opposing mount are oppositely positioned of each other about the paint box 1. A rotor 40 of the actuator motor 38 and the lead screw 41 are concentrically connected to each other so that the rotation of the actuator motor 38 is able to rotate the lead screw 41 within the present invention. For example, the stator 39 of the actuator motor 38 within the left linear actuator assembly 35 is mounted to the rear mount 32 (arbitrary mount), and the lead screw 41 of the left linear actuator assembly 35 is rotatably mounted to the front mount 31 (opposing mount). Then, the rotation of the actuator motor 38 which is mounted adjacent to the rear mount 32 is able to rotate the lead screw 41 which is rotatably mounted adjacent to the front mount 31. The bi-directional nut 42 is threadedly engaged along the lead screw 41 so that a rotational movement of the lead screw 41 can be converted into a linear movement. The at least one rail 44 is mounted to the arbitrary mount and the opposing mount and extended along the lead screw 41. The at least one sliding bracket 43 is engaged to the at least one rail 44. For example, the bi-directional nut 42 of the left linear actuator assembly 35 is threadedly engaged along the lead screw 41 of the left linear actuator assembly 35 so that a rotational movement can be converted into a linear movement. The at least one rail 44 of the left linear actuator assembly 35 is mounted to the arbitrary mount and the opposing mount and extended along the lead screw 41 of the left linear actuator assembly 35. The at least one sliding bracket 43 of the left linear actuator assembly 35 is engaged to the at least one rail 44 of the left linear actuator assembly 35.

Due to the aforementioned configuration, the left mount 33 is mounted to the bi-directional nut 42 and the at least one sliding bracket 43 of the left linear actuator assembly 35, and the right mount 34 is mounted to the bi-directional nut 42 and the at least one sliding bracket 43 of the right linear actuator assembly 36. Then, the cross actuator assembly 37 can be mounted and moved by the movements of the left mount 33 and the right mount 34. The paint discharge system 45 is mounted to the bi-directional nut 42 and the at least one sliding bracket 43 of the cross actuator assembly 37, thus allowing the user to fully control the movements of the paint discharge system 45 within the paint box 1.

The paint discharge system 45 dumps a flow of paint onto the canvas to create the abstract painting. In reference to FIG. 3 and FIG. 6, the paint discharge system 45 may comprise a support arm 46, a cup holder 47, a paint cup 48, and a cup actuating mechanism 49 so that the user is able to remotely control the operation of the paint discharge system 45. The support arm 46 is mounted to the bi-directional nut 42 and the at least one sliding bracket 43 of the cross actuator. The cup holder 47 is hingedly mounted to the support arm 46 by the cup actuating mechanism 49 so that the user can remotely control the positioning of the cup holder 47. The paint cup 48 is attached to the cup holder 47 and stores a quantity of paint within to initiate the painting process. Generally, the cup holder 47 is positioned parallel to the ground floor and the paint cup 48 is positioned normal to the ground floor so that the quantity of paint can be contained within the paint cup 48 during the movements of the left linear actuator assembly 35, the right linear actuator assembly 36, and the cross actuator assembly 37. Once the cup holder 47 is actuated via the cup actuating mechanism 49, the paint cup 48 is tilted towards the canvas thus allowing the quantity of paint to be discharged.

In reference to FIG. 3, the paint discharge system 45 may further comprise at least one paint discharging nozzle 50. More specifically, the at least one paint discharging nozzle 50 is connected to the cup holder 47 and oriented toward the paint cup 48 so that the quantity of paint can be automatically discharged from a cartridge to the paint cup 48. The discharging process of the quantity of paint from the cartridge is remotely controlled by the user to streamline the painting process within the present invention.

Figure 6:
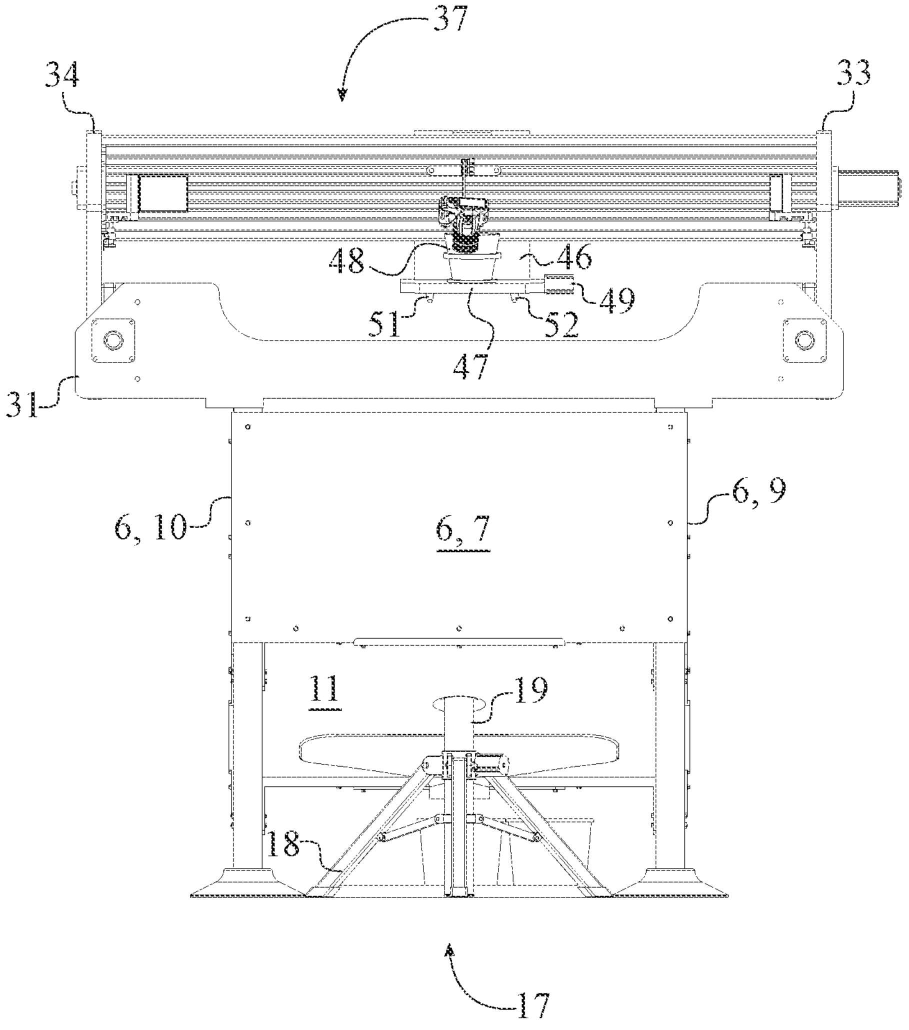
FIG. 6 is a front view of the present invention.

In reference to FIG. 6, the paint discharge system 45 may further comprise a water spraying nozzle 51 so that the paint within the canvas can be diluted upon user preference. More specifically, the water spraying nozzle 51 is connected to the cup holder 47 and oriented toward the canvas mount 26 so that a stream of water can be discharged onto the canvas. The water spraying nozzle 51 is connected to a water reservoir to provide a continuous supply of water. Furthermore, the water spraying nozzle 51 is selectively and remotely controlled by the user throughout the painting process.

In reference to FIG. 6, the paint discharge system 45 may further comprise an air spraying nozzle 52 so that the paint within the canvas can be pneumatically moved upon user preference. More specifically, the air spraying nozzle 52 is connected to the cup holder 47 and oriented toward the canvas mount 26 so that a stream of air can be discharged onto the canvas. The air spraying nozzle 52 is connected to an air compressor to provide a continuous supply of air. Furthermore, the air spraying nozzle 52 is selectively and remotely controlled by the user throughout the painting process.

In reference to FIG. 3, the present invention may further comprise at least one camera 53 to visually examine the painting process, to take a still shot of the painting, or to record the painting process. The camera 53 is mounted to the cross actuator assembly 37 and oriented toward the canvas mount 26 so that the total coverage area of the canvas can be captured by the camera 53. Preferably, the camera 53 is remotely controlled by the user to ease the painting process.

In reference to FIG. 3, the present invention may further comprise a first light 54 and a second light 55. The first light 54 is adjustably mounted to the left mount 33, and the second light 55 is adjustably mounted to the right mount 34. The first light 54 and the second light 55 are oriented toward the canvas mount 26 to illuminate the adjusted area of the canvas so that the camera 53 is able to capture quality and clear video feed or picture within the present invention. Preferably, the first light 54 and the second light 55 are remotely controlled by the user to ease the painting process.

Figure 8:
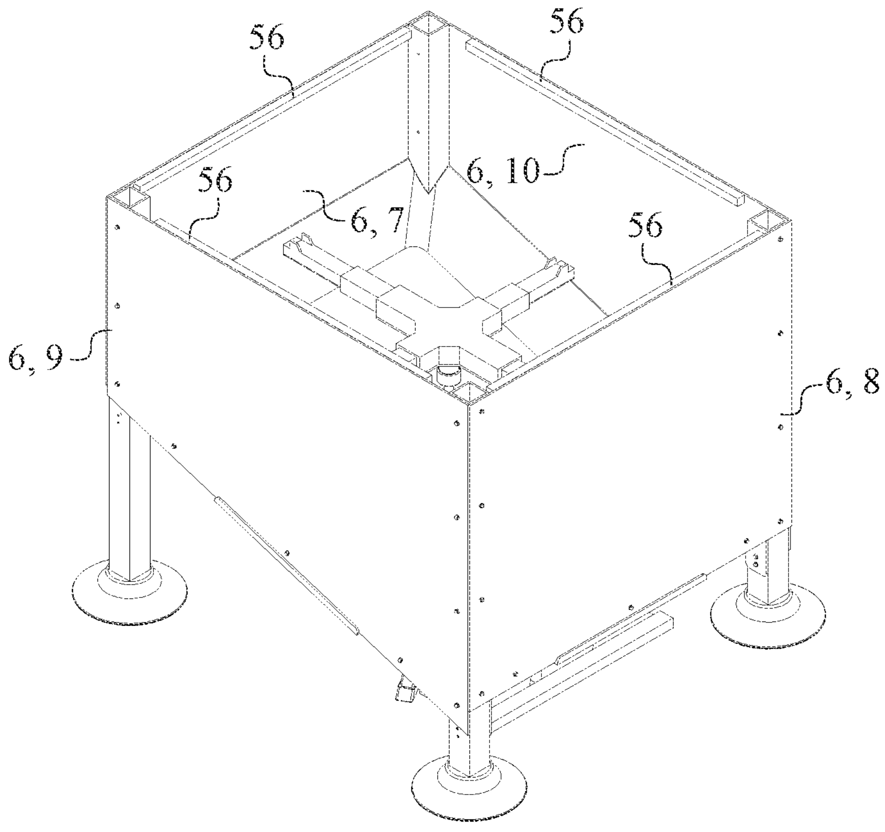
FIG. 8 is a perspective view of the paint box showing the integrated paint drying unit.

In reference to FIG. 8, the present invention may further comprise a paint drying unit 56 that is integrated into the lateral cover 6. More specifically, the paint drying unit 56 is able to dry the paint within the canvas after or during the painting process. As a result, the user is able to eliminate unnecessary movement of the paint after the desired abstract paint is completed. Preferably, the paint drying unit 56 is remotely controlled by the user to ease the painting process.

It is understood that all of the electrical components within the present invention (the tripod motor 25, the plurality of telescopic arms 28, the actuator motor 38 for the left linear actuator assembly 35, the right linear actuator assembly 36, and the cross actuator assembly 37, the paint discharge system 45, the at least one camera 53, the first light 54, the second light 55, and the paint drying unit 56) are electrically powered through an external power source. it is also understood that remotely controlled components within the present invention are controlled through a computing device according to the suer preference.

Although the invention has been explained in relation to its preferred embodiment, it is to be understood that many other possible modifications and variations can be made without departing from the spirit and scope of the invention as hereinafter claimed.

What is claimed is:

1. An abstract painting apparatus comprising:
a paint box;
a tripod system;
a canvas mount;
a gantry system;
a paint discharge system;
the paint box comprising a plurality of legs, a lateral cover, and a slanted bottom cover;
the gantry system comprising a plurality of mounts, a left linear actuator assembly, a right linear actuator assembly, and a cross actuator assembly;
the plurality of legs comprising a first leg, a second leg, a third leg, and a fourth leg;
the plurality of mounts comprising a front mount, a rear mount, a left mount, and a right mount;
the left linear actuator assembly, the right linear actuator assembly, and the cross actuator assembly comprising an actuator motor, a lead screw, a bi-directional nut, at least one sliding bracket, and at least one rail;
the lateral cover being perimetrically mounted around the plurality of legs;
the slanted bottom cover being perimetrically mounted to the lateral cover;
the tripod system being concentrically mounted through the slanted bottom cover;
the canvas mount being pivotably and terminally mounted to the tripod system;
the canvas mount being positioned within the lateral cover and the slanted bottom cover;
the gantry system being mounted onto the plurality of legs;
the gantry system being positioned atop the canvas mount;
the paint discharge system being operatively coupled to the gantry system, wherein the paint discharge system is moved above the canvas mount by the gantry system;
the front mount being mounted onto the first leg and the second leg;
the rear mount being mounted onto the third leg and the fourth leg;
the left linear actuator assembly being mounted to the front mount and the rear mount;
the left linear actuator assembly being extended from the first leg to the third leg,
the right linear actuator assembly being mounted to the front mount and the rear mount;
the right linear actuator assembly being extended from the second leg to the fourth leg;
the left mount being slidably mounted to the left linear actuator assembly;
the left mount and the front mount being positioned perpendicular to each other;
the right mount being slidably mounted to the right linear actuator assembly;
the right mount and the front mount being positioned perpendicular to each other;
the cross actuator assembly being mounted to the left mount and the right mount;
the cross actuator assembly being extended from a left cover of the lateral cover to a right cover of the lateral cover;
a stator of the actuator motor being mounted to an arbitrary mount from the plurality of mounts;
the lead screw being rotatably mount to an opposing mount from the plurality of mounts;
the arbitrary mount and the opposing mount being oppositely positioned of each other about the paint box;
a rotor of the actuator motor and the lead screw being concentrically connected to each other;
the bi-directional nut being threadedly engaged along the lead screw;
the at least one rail being mounted to the arbitrary mount and the opposing mount;
the at least one rail being extended along the lead screw; and
the at least one sliding bracket being engaged to the at least one rail.

2. The abstract painting apparatus as claimed in claim 1 comprising:
the lateral cover comprising a front cover, a rear cover, a left cover, and a right cover;
the front cover being externally mounted to the first leg and the second leg;
the rear cover being externally mounted to the third leg and the fourth leg;
the left cover being externally mounted to the first leg and the third leg;
the right cover being externally mounted to the second leg and the fourth leg; and
the slanted bottom cover being perimetrically mounted the front cover, the rear cover, the left cover, and the right cover.

3. The abstract painting apparatus as claimed in claim 1 comprising:
the paint box further comprising a drain and a gutter system;
the drain being mounted to the slanted bottom cover;
the gutter system and the canvas mount being oppositely positioned of each other about the slanted bottom cover; and
the gutter system being mounted offset from the drain.

4. The abstract painting apparatus as claimed in claim 3 comprising:
the gutter system comprising a first bucket, a second bucket, and a support track;
the lateral cover comprising a left cover and a right cover;
the support track being mounted offset from the slanted bottom cover;
the support track being extended in between the left cover and the right cover;
the support track being positioned below the drain;
the first bucket being slidably mounted along the support track; and
the second bucket being slidably mounted along the support track.

5. The abstract painting apparatus as claimed in claim 1 comprising:
the tripod system comprising a retractable base, an extension shaft, a ball mount mechanism, and a tripod motor;
the retractable base being connected to a proximal end of the extension shaft;
a stationary body of the ball mount mechanism being connected to a distal end of the extension shaft;
the tripod motor being integrated into the stationary body;
a rotary body of the ball mount mechanism being pivotably engaged with the tripod motor through the stationary body; and
the canvas mount being concentrically mounted to the rotary body.

6. The abstract painting apparatus as claimed in claim 1 comprising:

the canvas mount comprising a hub and a plurality of telescopic arms;

the tripod system comprising a ball mount mechanism;

the plurality of telescopic arms being equally spaced around the hub;

the plurality of telescopic arms being terminally connected to the hub; and the hub being concentrically mounted to a rotary body of the ball mount mechanism.

7. The abstract painting apparatus as claimed in claim 1 comprising:

the paint discharge system comprising a support arm, a cup holder, a paint cup, and a cup actuating mechanism;

the support arm being mounted to the bi-directional nut of the cross actuator assembly and the at least one sliding bracket of the cross actuator assembly;

the cup holder being hingedly mounted to the support arm by the cup actuating mechanism; and the paint cup being attached to the cup holder.

8. The abstract painting apparatus as claimed in claim 7 comprising:

the paint discharge system further comprising at least one paint discharging nozzle;

the at least one paint discharging nozzle being connected to the cup holder; and the at least one paint discharging nozzle being oriented toward the paint cup.

9. The abstract painting apparatus as claimed in claim 7 comprising:

the paint discharge system further comprising a water spraying nozzle;

the water spraying nozzle being connected to the cup holder; and the water spraying nozzle being oriented toward the canvas mount.

10. The abstract painting apparatus as claimed in claim 7 comprising:

the paint discharge system further comprising an air spraying nozzle;

the air spraying nozzle being connected to the cup holder; and the air spraying nozzle being oriented toward the canvas mount.

11. The abstract painting apparatus as claimed in claim 1 comprising:

at least one camera;

the camera being mounted to the cross actuator assembly; and the camera being oriented toward the canvas mount.

12. The abstract painting apparatus as claimed in claim 1 comprising:

a first light;

a second light;

the first light being adjustably mounted to a left mount of the plurality of mounts;

the second light being adjustably mounted to a right mount of the plurality of mounts;

the first light being oriented toward the canvas mount; and the second light being oriented toward the canvas mount.

13. The abstract painting apparatus as claimed in claim 1 comprising:

a paint drying unit; and the paint drying unit being integrated into the lateral cover.

* * * * *